(12) United States Patent
Furtner

(10) Patent No.: US 11,509,410 B2
(45) Date of Patent: Nov. 22, 2022

(54) METHOD FOR A SLAVE DEVICE FOR CALIBRATING ITS OUTPUT TIMING, METHOD FOR A MASTER DEVICE FOR ENABLING A SLAVE DEVICE TO CALIBRATE ITS OUTPUT TIMING, MASTER DEVICE AND SLAVE DEVICE

(71) Applicant: Infineon Technologies AG, Neubiberg (DE)

(72) Inventor: Wolfgang Furtner, Fuerstenfeldbruck (DE)

(73) Assignee: Infineon Technologies AG, Neubiberg (DE)

( * ) Notice: Subject to any disclaimer, the term of this patent is extended or adjusted under 35 U.S.C. 154(b) by 244 days.

(21) Appl. No.: 16/894,727

(22) Filed: Jun. 5, 2020

(65) Prior Publication Data

US 2020/0389244 A1 Dec. 10, 2020

(30) Foreign Application Priority Data

Jun. 6, 2019 (EP) ..................................... 19178649

(51) Int. Cl.
*H04J 3/06* (2006.01)
*H04L 7/00* (2006.01)
(52) U.S. Cl.
CPC .......... *H04J 3/0638* (2013.01); *H04L 7/0008* (2013.01)
(58) Field of Classification Search
CPC ... H04L 7/0016; H04L 7/0008; H04L 7/0012; H04L 7/002; H04L 7/0033; H04L 7/0045; H04L 7/005; H04L 7/0037; H04L 7/0041; H04L 7/0025; H04L 7/0029; H04L 7/00454; H04L 7/0058; H04L 7/0062; H04L 7/0066; H04L 7/007
See application file for complete search history.

(56) References Cited

U.S. PATENT DOCUMENTS

| | | | | |
|---|---|---|---|---|
| 4,695,805 A * | 9/1987 | Massingill | ............. | H03K 5/135 327/156 |
| 5,587,709 A * | 12/1996 | Jeong | ...................... | H03M 9/00 341/100 |
| 6,665,308 B1 * | 12/2003 | Rakib | ................... | H04L 27/362 370/479 |

(Continued)

*Primary Examiner* — Dung B Huynh
(74) *Attorney, Agent, or Firm* — Murphy, Bilak & Homiller, PLLC

(57) ABSTRACT

A method for a slave device for calibrating an output timing for transmitting data to a master device is provided. The master and slave devices are communicatively coupled via an interface. The method includes: receiving, from the master device, one or more consecutive first signal edges indicating a synchronization event; recovering a reference clock of the master device based on the one or more consecutive first signal edges; transmitting one or more predetermined second signal edges to the master device and generated using the recovered reference clock; receiving, from the master device, data indicating one or more sampled values of the master device for the one or more predetermined second signal edges; and adjusting the output timing based on a comparison of the one or more predetermined second signal edges and the one or more sampled values of the master device for the one or more predetermined second signal edges.

15 Claims, 8 Drawing Sheets

(56) References Cited

U.S. PATENT DOCUMENTS

| | | | |
|---|---|---|---|
| 7,231,306 B1* | 6/2007 | Rajan | H04L 7/0091 702/89 |
| 7,256,627 B1* | 8/2007 | Talbot | G06F 1/12 327/146 |
| 7,295,644 B1* | 11/2007 | Wu | H03L 7/0807 375/375 |
| 7,342,521 B1* | 3/2008 | Liu | H03L 7/07 341/147 |
| 7,415,073 B2* | 8/2008 | Ware | H04L 25/12 375/257 |
| 7,864,912 B1* | 1/2011 | Wu | H03L 7/093 375/375 |
| 8,467,418 B2* | 6/2013 | Aweya | H03L 7/0805 370/507 |
| 10,116,315 B1* | 10/2018 | Zhuang | H04L 7/033 |
| 10,284,395 B2* | 5/2019 | Chiu | H04L 25/03031 |
| 10,461,753 B1* | 10/2019 | Pritchard | H03L 7/00 |
| 10,826,502 B1* | 11/2020 | Badizadegan | H03L 7/085 |
| 11,165,553 B1* | 11/2021 | Reiss | H03L 7/0814 |
| 11,290,305 B2* | 3/2022 | Zerbe | H04L 7/0087 |
| 2003/0198309 A1* | 10/2003 | Abrosimov | G01R 31/31725 375/354 |
| 2005/0147194 A1* | 7/2005 | Koenenkamp | H04L 7/0334 375/348 |
| 2005/0268149 A1* | 12/2005 | Sherlock | H04L 7/0337 714/2 |
| 2006/0153326 A1* | 7/2006 | Choi | H04L 7/0008 375/360 |
| 2007/0064852 A1* | 3/2007 | Jones | H04L 7/02 375/356 |
| 2007/0297552 A1* | 12/2007 | Bae | H03K 19/0966 375/371 |
| 2009/0041104 A1* | 2/2009 | Bogdan | H04L 7/0079 375/226 |
| 2010/0177790 A1* | 7/2010 | Arima | H03L 7/091 370/503 |
| 2011/0001533 A1* | 1/2011 | Lee | H03K 3/356139 327/199 |
| 2011/0170644 A1* | 7/2011 | Iqbal | H04L 7/0337 375/355 |
| 2011/0286560 A1* | 11/2011 | Pignatelli | H04J 3/0655 375/356 |
| 2011/0298508 A1* | 12/2011 | Wu | H04L 7/0337 327/158 |
| 2012/0049909 A1* | 3/2012 | Lin | H03L 7/087 327/156 |
| 2012/0063534 A1* | 3/2012 | Lin | H04L 7/033 327/155 |
| 2012/0069944 A1* | 3/2012 | Hadzic | H04L 7/033 375/376 |
| 2012/0229184 A1* | 9/2012 | Lin | H04L 7/0079 327/144 |
| 2012/0275494 A1* | 11/2012 | Ma | H04B 1/0475 375/362 |
| 2012/0306551 A1* | 12/2012 | Moon | H03L 7/0816 327/149 |
| 2013/0106377 A1* | 5/2013 | Lee | H02M 3/157 323/282 |
| 2013/0249612 A1* | 9/2013 | Zerbe | G11C 7/1066 327/161 |
| 2013/0279637 A1* | 10/2013 | Kent | H04L 27/2675 375/371 |
| 2013/0342249 A1* | 12/2013 | Yang | H03L 7/0818 327/158 |
| 2014/0010317 A1* | 1/2014 | Oshikiri | H04L 7/0012 375/259 |
| 2014/0347108 A1* | 11/2014 | Zerbe | H03L 7/099 327/158 |
| 2014/0348279 A1* | 11/2014 | Chen | H03M 1/12 375/355 |
| 2015/0003842 A1* | 1/2015 | Chen | H04L 7/0337 398/155 |
| 2015/0163000 A1* | 6/2015 | Aweya | H04L 7/033 370/503 |
| 2016/0080138 A1* | 3/2016 | Biederman | H04L 7/0037 375/354 |
| 2016/0335211 A1* | 11/2016 | Zwart | G06F 13/3625 |
| 2017/0338938 A1* | 11/2017 | Fang | H04J 3/0638 |
| 2019/0007243 A1* | 1/2019 | Burbano | H03K 9/08 |
| 2019/0132112 A1* | 5/2019 | Ballani | H04J 3/0638 |
| 2019/0196532 A1* | 6/2019 | Jang | G06F 13/4291 |
| 2019/0273502 A1* | 9/2019 | Khalid | G01S 7/2806 |
| 2020/0065277 A1* | 2/2020 | Poulsen | G06F 13/36 |
| 2020/0336285 A1* | 10/2020 | Sun | H04B 10/40 |
| 2020/0389244 A1* | 12/2020 | Furtner | G06F 13/4291 |
| 2021/0042253 A1* | 2/2021 | Poulsen | G06F 13/36 |
| 2021/0190935 A1* | 6/2021 | Yu | G01S 13/84 |
| 2021/0320783 A1* | 10/2021 | Masuda | H04L 7/06 |
| 2022/0029629 A1* | 1/2022 | Yang | H03L 7/0998 |

* cited by examiner

METHOD FOR A SLAVE DEVICE FOR CALIBRATING ITS OUTPUT TIMING, METHOD FOR A MASTER DEVICE FOR ENABLING A SLAVE DEVICE TO CALIBRATE ITS OUTPUT TIMING, MASTER DEVICE AND SLAVE DEVICE

TECHNICAL FIELD

The present disclosure relates to output timing calibration for slave devices. In particular, examples relate to method for a slave device for calibrating an output timing for transmitting data to a master device, and a method for a master device for enabling a slave device communicatively coupled to the master device via an interface to calibrate an output timing. Further example relate to a master device and a slave device.

BACKGROUND

For master and slave devices coupled via an interface (e.g. a bus), the master device provides a reference clock used by the master and slave devices for timing their respective output as well as sampling operation. In such a system, significant transmission line delays and Input/Output (I/O) delays compared to the duration of a single symbol may occur. Further, a roundtrip delay of the system (i.e. the time span between sending data from device A to device B and receiving data from device B at device A) depends on the structure of the system as well as temperature.

It is difficult for the master device to select the right sampling point for sampling signals received from the slave devices. For example, if different slave devices exhibit different roundtrip delays, the sampling point of the master device should be different for each slave device.

SUMMARY

Hence, there may be a demand for an output timing calibration for a slave device such that sampling is facilitated for a master device.

An example relates to a method for a slave device for calibrating an output timing for transmitting data to a master device. The master device and the slave device are communicatively coupled via an interface. The method comprises receiving, from the master device, one or more consecutive first signal edges indicating a synchronization event. Further, the method comprises recovering a reference clock of the master device based on the one or more consecutive first signal edges. The method comprises transmitting one or more predetermined second signal edges to the master device. The one or more predetermined second signal edges are generated by the slave device using the recovered reference clock. Additionally, the method comprises receiving, from the master device, data indicating one or more sampled values of the master device for the one or more predetermined second signal edges. The method comprises adjusting the output timing based on a comparison of the one or more predetermined second signal edges and the one or more sampled values of the master device for the one or more predetermined second signal edges.

Another example relates to a method for a master device for enabling a slave device communicatively coupled to the master device via an interface to calibrate an output timing. The method comprises transmitting one or more consecutive first signal edges indicating a synchronization event to the slave device. The one or more consecutive first signal edges are generated using a reference clock of the master device. Further, the method comprises sampling one or more predetermined second signal edges received from the slave device using the reference clock to obtain sampled values for the one or more predetermined second signal edges. The method additionally comprises transmitting data indicating the one or more sampled values for the one or more predetermined second signal edges to the slave device.

A further example relates to a slave device adapted to calibrate an output timing for transmitting data to a master device. The master device and the slave device are communicatively coupled via an interface. The slave device comprises a receiver circuit configured to receive, from the master device, one or more consecutive first signal edges indicating a synchronization event. Further, the slave device comprises a processing circuit configured to recover a reference clock of the master device based on the one or more consecutive first signal edges. The slave device additionally comprises a transmitter circuit configured to transmit one or more predetermined second signal edges to the master device. The one or more predetermined second signal edges are generated by the slave device using the recovered reference clock. The receiver circuit is further configured to receive, from the master device, data indicating one or more sampled values of the master device for the one or more predetermined second signal edges. The processing circuit is further configured to adjust the output timing based on a comparison of the one or more predetermined second signal edges and the one or more sampled values of the master device for the one or more predetermined second signal edges.

A still further example relates to a master device adapted to enable a slave device communicatively coupled to the master device via an interface to calibrate an output timing. The master device comprises a transmitter circuit configured to transmitting one or more consecutive first signal edges indicating a synchronization event to the slave device, wherein the one or more consecutive first signal edges are generated using a reference clock of the master device. Additionally, the master device comprises a receiver circuit configured to sample one or more predetermined second signal edges received from the slave device using the reference clock to obtain sampled values for the one or more predetermined second signal edges. The transmitter circuit is further configured to transmit data indicating the one or more sampled values for the one or more predetermined second signal edges to the slave device.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
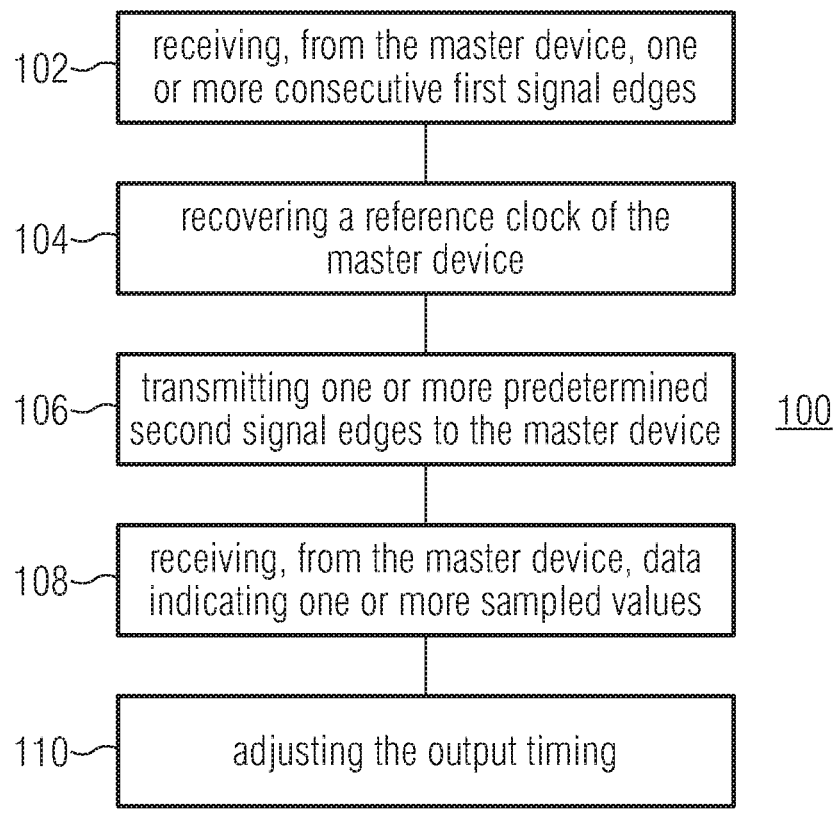
FIG. 1 illustrates a flowchart of an example of a method for a slave device for calibrating an output timing for transmitting data to a master device.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

The proposed calibration technique for calibrating an output timing of a slave device involves actions of the slave device itself and a master device communicatively coupled to the slave device via an interface. The master device and the slave device are electronic devices communicating via the interface. In this respect, the master device has unidirectional control over the slave device. The interface may be any wired communication interface using any signaling levels or methods (e.g. Low Voltage Differential Signaling, LVDS; Complementary Metal-Oxide-Semiconductor, CMOS, signaling; or Transistor-Transistor logic, TTL, signaling). For example, the interface may be a differential or a single-ended interface. The interface may, e.g., use parallel or serial line termination (i.e. method 100 may also be used in presence of reflections at the interface). It is to be noted that the proposed calibration technique is not limited to a specific implementation of the interface.

The term "output timing" denotes the time instance at which an electronic circuit such as the master device or the slave device outputs an output signal to the interface.

Figure 2:
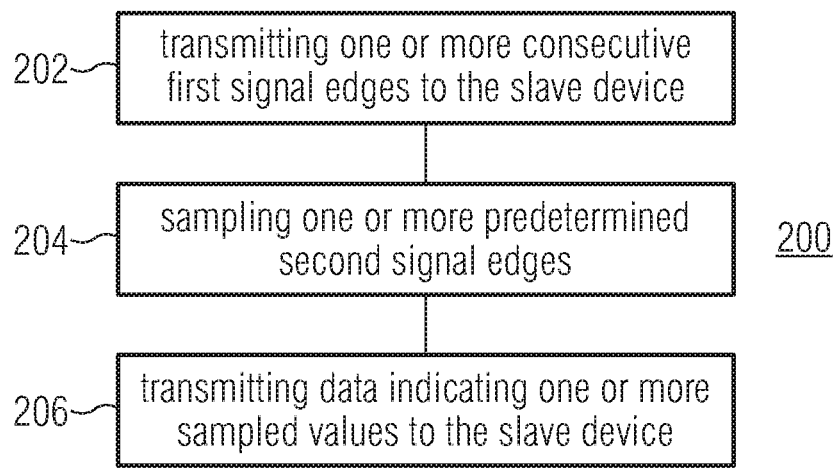
FIG. 2 illustrates a flowchart of an example of a method for a master device for enabling a slave device communicatively coupled to the master device via an interface to calibrate an output timing.

The calibration process will be described in the following with reference to FIGS. 1 and 2. FIG. 1 illustrates a flowchart of a method 100 for the slave device for calibrating its output timing for transmitting data to the master device. In other words, method 100 describes the steps performed by the slave device for output timing calibration. On the other hand, FIG. 2 illustrates a flowchart of a method 200 for the master device for enabling the slave device to calibrate its output timing. That is, method 200 describes the steps performed by the master device for calibrating the output timing of the slave device.

Method 200 comprises transmitting 202 one or more consecutive first signal edges indicating a synchronization event to the slave device. The one or more consecutive first signal edges are generated using a reference clock of the master device. The reference clock (e.g. an oscillation signal) is a sequence of clock cycles used by the master device for outputting data to the interface and for sampling data received via the interface. For example, the clock cycles of the reference clock may determine a length of a data symbol in the modulation scheme used by the master device and the slave device for data exchange. Method 100 respectively comprises receiving 102, from the master device, the one or more consecutive first signal edges indicating the synchronization event. The synchronization event is an event that allows the slave device to synchronize to the reference clock (time, timing) of the master device. The synchronization event may be indicated by a single first signal edge (e.g. a rising signal edge, i.e. a transition from a low first signal level to a higher) second signal level, or a falling signal edge) or a plurality of consecutive first signal edges (e.g. a predetermined sequence of rising and falling signal edges). The one or more consecutive first signal edges allow to encode information about a phase and a frequency of the reference clock of the master device. In other words, the synchronization event may be any signal pattern that allows to provide phase and frequency information of the reference clock. For example, a predetermined burst or a code may be encoded to (by) the one or more consecutive first signal edges for indicating the synchronization event.

As described above, the synchronization event allows the slave device to synchronize to the reference clock of the master device. Therefore, method 100 comprises recovering 104 the reference clock of the master device based on the one or more consecutive first signal edges. The recovery of the master device's reference clock may be done using known clock recovery techniques (e.g. using a Phase-Locked Loop, PLL, or a Delay-Locked Loop, DLL, at the slave device). The recovered reference clock is used by the slave device for decoding the one or more consecutive first signal edges so that the slave device is able to detect the synchronization event in the signal received from the master device.

Method 100 additionally comprises transmitting 106 one or more predetermined second signal edges to the master device via the interface in response to detecting the synchronization event. The one or more predetermined second signal edges are generated by the slave device using the recovered reference clock. For example, the slave device may output the one or more predetermined second signal edges synchronous to a predetermined signal edge for one or more clock cycles of the recovered reference clock or a phase-shifted replica of the recovered reference clock. The one or more predetermined second signal edges are either a single predetermined signal edge (e.g. a falling signal edge if the master device has left the interface at a high signal level) or a predetermined sequence of rising and falling signal edges. In some examples, the slave device may, e.g., transmit the one or more predetermined second signal edges within a predetermined time slot following the one or more consecutive first signal edges. In other words, the slave device may transmit the one or more predetermined second signal edges to the master device after a predefined time span since receiving the one or more consecutive first signal edges has lapsed (e.g. a predefined number of clock cycles of the reference clock).

The master device receives the one or more predetermined second signal edges. Accordingly, method 200 comprises sampling 204 the one or more predetermined second signal edges using the reference clock to obtain sampled values for the one or more predetermined second signal edges. For example, the master device may sample the one or more predetermined second signal edges at a predetermined signal edge for one or more clock cycles of the reference clock. The sampled value(s) indicate(s) the respective signal level(s) of the one or more predetermined second signal edges at the respective sampling time(s), wherein the sampling time(s) are based on (determined by) the reference clock of the master device.

Further, method 200 comprises transmitting 206 data indicating the one or more sampled values for the one or more predetermined second signal edges to the slave device via the interface. For example, the slave device may generate and transmit one or more consecutive signal edges and/or signal levels indicating the one or more sampled values for the one or more predetermined second signal edges. In other words, the master device may effectively "reflect" the edge data received from the slave device back to the slave device.

Method 100 respectively comprises receiving 108, from the master device, the data indicating the one or more sampled values of the master device for the one or more predetermined second signal edges. The recovered reference clock is used by the slave device for decoding the data indicating the one or more sampled values of the master device.

Additionally, method 100 comprises adjusting 110 the output timing of the slave device (by the slave device itself) based on a comparison of the one or more predetermined second signal edges and the one or more sampled values of the master device for the one or more predetermined second signal edges.

The one or more predetermined second signal edges transmitted by the slave device to the master device represent a known data transition at the output of the slave device (e.g. driving low after the master device has left the interface at a high signal level). Similarly, the one or more sampled values of the master device for the one or more predetermined second signal edges represent the known data transition at the input of the master device at the sampling time(s) of the master device. By comparing the sampled values of the master device for the one or more predetermined second signal edges to the one or more predetermined second signal edges, the slave device may determine whether the one or more predetermined second signal edges are leading or trailing the sampling time(s), i.e. the reference clock of the master device, at the input of the master device. Accordingly, adjusting 108 the output timing may comprise comparing one or more signal levels indicated by the one or more sampled values of the master device with the one or more predetermined second signal edges for determining whether the one or more predetermined second signal edges are leading or trailing the reference clock of the master device at the input of the master device.

Based on the comparison result, the slave device adjusts its output timing to compensate for the discrepancy. For example, adjusting 108 the output timing may comprise shifting the output timing of the slave device to an earlier output timing (e.g. by a fraction of the reference clock or a predetermined time shift) if the one or more predetermined second signal edges are trailing the reference clock of the master device, or shifting the output timing of the slave device to a later output timing (e.g. by a fraction of the reference clock or a predetermined time shift) if the one or more predetermined second signal edges are leading the reference clock of the master device.

The proposed calibration procedure described above with reference to FIGS. 1 and 2 may allow fast self-adjustment of the slave device's output timing such that the slave device's data arrives at the master device in an optimized way. For example, the slave device's data may arrive at the master device at the optimal sampling time of the master device. In other words, the slave device's data arriving at the master device may be synchronous to the sampling time of the master device (i.e. the reference clock of the master device) after calibration.

Although the proposed calibration procedure was described above taking into account only a single slave device, it is to be noted that the proposed calibration procedure may be used to analogously calibrate further slave devices communicatively coupled to the master device via the interface. The proposed calibration procedure allows to adjust the output timings of multiple slaves independently from each other by performing the method steps described above separately for each slave device. The output timing calibration of multiple slave devices may be done one by one or in parallel. If multiple slave devise are communicatively coupled, calibrating the output timings of the individual slave devices according to the proposed technique may allow the master device to sample signals from all slave devices with the same sampling timing (e.g. with the same sampling circuit). In particular, the proposed calibration procedure may allow to compensate for the different I/O delays and the different propagation delays of the slave devices. The proposed calibration procedure may, hence, further allow collision avoidance of data (e.g. symbols) transmitted by different slave devices to the master device via the interface.

Methods 100 and 200 may, e.g., be performed during boot up of the slave device(s) for compensating system tolerances. Alternatively or additionally, methods 100 and 200 may be performed between two payload data exchanges between the master device and the slave device. In other words, the proposed calibration procedure may be performed during regular operation to, e.g., compensate for temperature drifts, etc.

In the following, further aspects of the proposed calibration procedure are described in connection with an exemplary implementation using a differential bus as interface. However, it is to be noted that the aspects of the proposed calibration procedure described in the following are not limited to implementations using a differential bus as interface. In general, any interface may be used.

Figure 3:
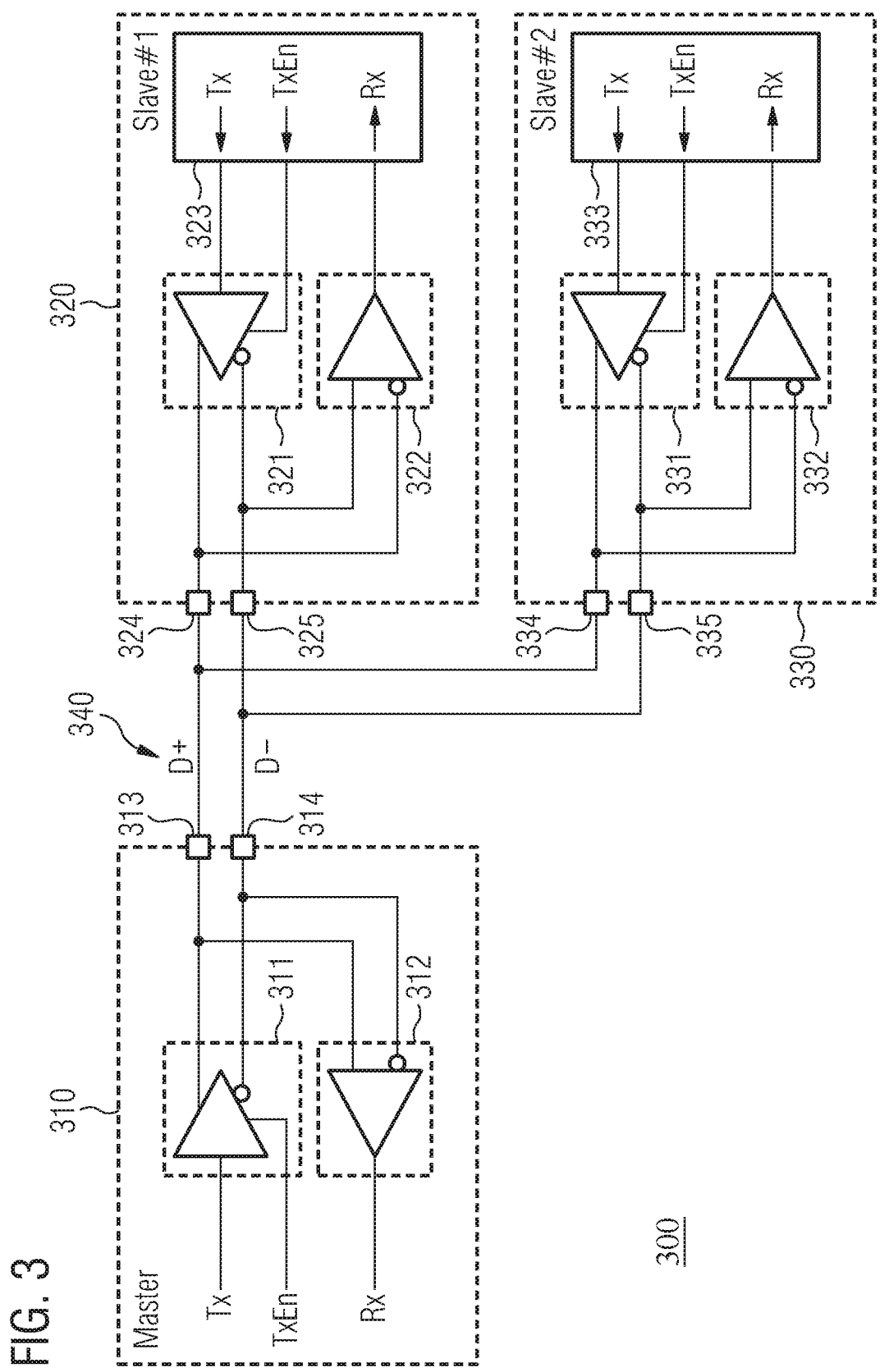
FIG. 3 illustrates an example of a system comprising a master device and slave devices.

FIG. 3 illustrates an example of a system 300 comprising a master device 310 according to the proposed technique, two slave devices 320 and 330 according to the proposed technique and a differential bus interface 340 communicatively coupling the master device 310 with the slave devices 320 and 330.

The master device 310 comprises a transmitter circuit 311 for transmitting data via the interface 340 and a receiver circuit 312 for receiving data from the interface 340. In the example of FIG. 3, the transmitter circuit 311 and the receiver circuit 312 are schematically indicated by respective driver circuits. However, it is to be noted that the transmitter circuit 311 and the receiver circuit 312 may comprise additional or different elements (circuits). The master device 310 is coupled to the two differential signal lines D+ and D− of the interface 340 by means of terminals 313 and 314 (e.g. pins or contact pads). Although not illustrated, the master device 310 may comprise additional circuitry such as a memory or a processing circuit (a single dedicated processor, a single shared processor, or a plurality of individual processors, some of which or all of which may be shared, a digital signal processor hardware, an application specific integrated circuit or a field programmable gate array).

Similarly, each of the slave devices 320 and 330 comprises a respective transmitter circuit 321, 331 and a respective receiver circuit 322, 332. Further, the slave devices 320 and 330 comprise a respective processing circuit 323, 333. The slave devices couple to the two signal lines D+ and D− of the interface 340 by means of terminals 324, 325, 334 and 335. Although not illustrated, the slave devices 320 and 330 may comprise additional circuitry such as a memory.

The slave devices 320 and 330 are coupled to the interface 340 at different points of the interface. Therefore, the length of the signal (transmission) line(s) coupling the slave device 320 to the master device 310 is different from the signal (transmission) line(s) coupling the slave device 330 to the master device 310. The different distances between the master device 310 and the two slave devices 320 and 330 cause different propagation delays (times) for signals transmitted from the slave devices 320 and 330 to the master device 310, and vice versa.

Figure 4:
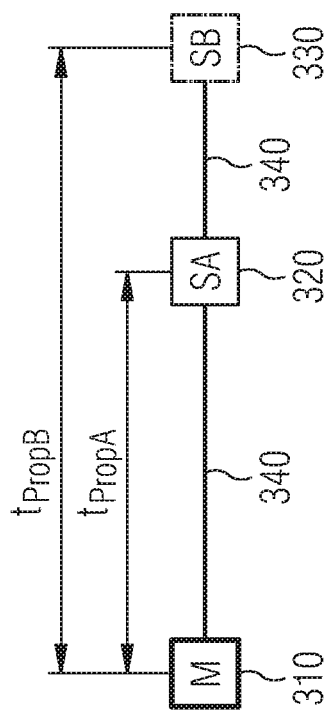
FIG. 4 illustrates an exemplary comparison of propagation delays for different slave devices.

This is exemplarily illustrated in FIG. 4. In the example of FIG. 4, a distance of the slave device 320 to the master device 310 along the interface 340 is smaller than a distance of the slave device 330 to the master device 310 along the interface 340. In other words, the slave device 320 is arranged closer to the master device 310 than the other slave device 330. Therefore, the propagation delay $t_{PropA}$ for signals exchanged between the slave device 320 and the master device 310 is smaller than the propagation delay $t_{PropB}$ for signals exchanged between the other slave device 330 and the master device 310. Further, each of the slave devices 320 and 330 may exhibit a different output timing.

Using the proposed calibration technique, the output timings of the slave devices 320 and 330 may be aligned to the reference clock of the master device.

Although the system 300 comprises two slave devices 320 and 330, the proposed calibration technique will be described in the following with respect to slave device 320 only. It is to be noted that the output timing of the other slave device 330 may be adjusted accordingly. Further, it is to be noted that the proposed calibration technique may be used for systems comprising more or less slave devices than the system 300.

Figure 5:
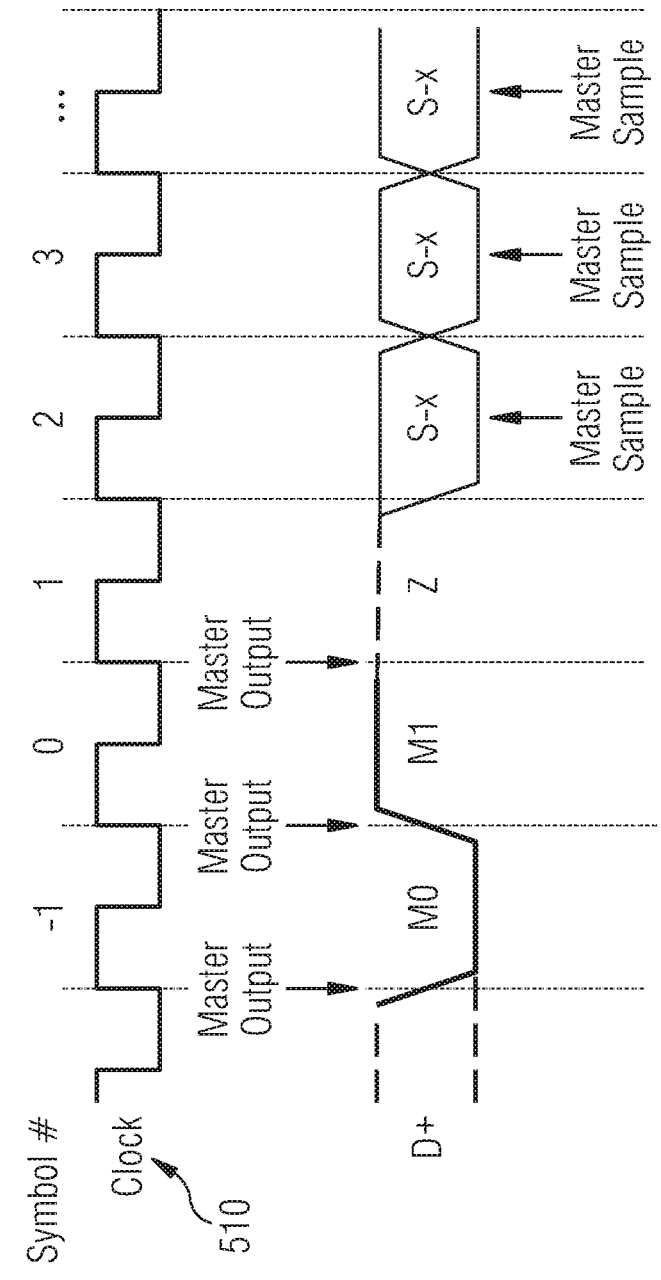
FIG. 5 illustrate exemplary output and sampling timings of a master device.

FIG. 5 schematically illustrates the operation of the master device 310. FIG. 5 illustrates in the upper part the reference clock (signal) 510 of the master device 310. In the example of FIG. 5, it is assumed that the length (duration) of a data symbol used for exchanging data between the master device 310 and the slave device 320 is equal to the length (duration) of a clock cycle of the reference clock 510.

For ease of explanation, it is assumed that the master device generates its output synchronized to the leading edge of the reference clock 510 (i.e. the rising edge in this example), and that the master device samples input data synchronized to the trailing edge of the reference clock 510 (i.e. the falling edge in this example). In other words, data sampling in the master is done with a 180° phase offset compared to the data generation to hit center of the data eye. However, it is to be noted that also phase offsets different from 180° may be used.

In the lower part of FIG. 5, the signal of signal line D+ as observed at the terminal 313 of the master device 310 is illustrated. Since the master device 310 generates its output at the leading edge of the internal symbol clock, the master device 310 generates signal transitions between different signal levels (i.e. rising or falling signal edges) synchronous to the leading edge of the reference clock 510. In the example of FIG. 5, the master device 310 outputs data in symbol slots −1 and 0 by generating signal transitions synchronous to the leading edges of the clock cycles associated to symbol slots −1 and 0.

During symbol slot 1, the signal line D+ is undriven, i.e. in a tri-state mode to avoid collisions between output data of the master device 310 and input data from the slave device 320. From symbol slot 2 onwards, symbols transmitted by the slave device 320 arrive at the terminal 313 of the master device 310. The master device 310 samples the incoming data synchronous to the trailing edge of the reference clock 510 to sample the symbols of the slave device 320 in the center.

In the example of FIG. 5, the input symbols are transmitted such by the slave device 310 that the signal edges of the input symbols are perfectly aligned with the leading edge of the reference clock 510 at the terminal 313 of the master device 310. To achieve such alignment, the output timing of the slave device 320 is adjusted according to the proposed calibration technique.

Figure 6:
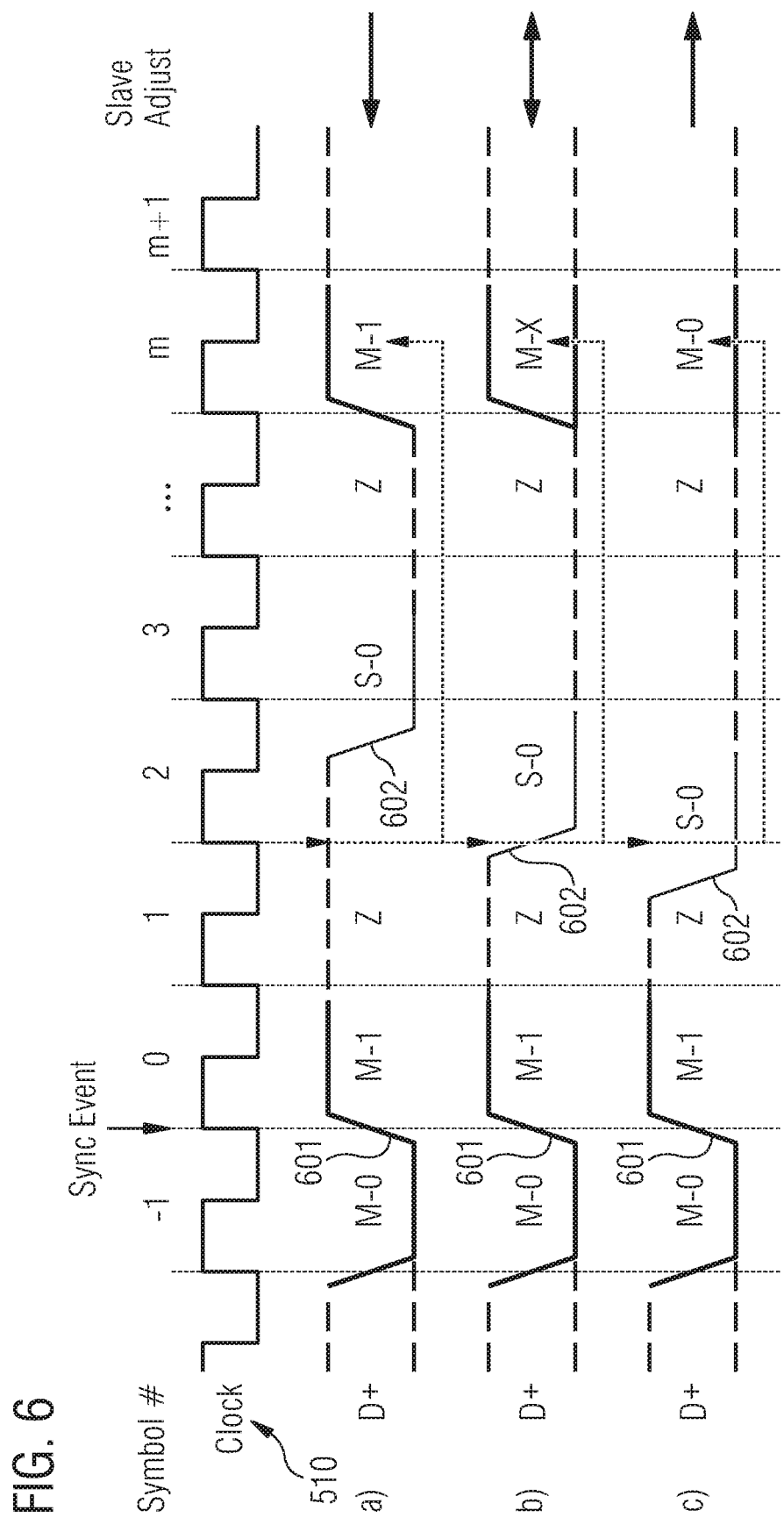
FIG. 6 illustrates an example of a proposed signal flow for calibration.
Figure 7:
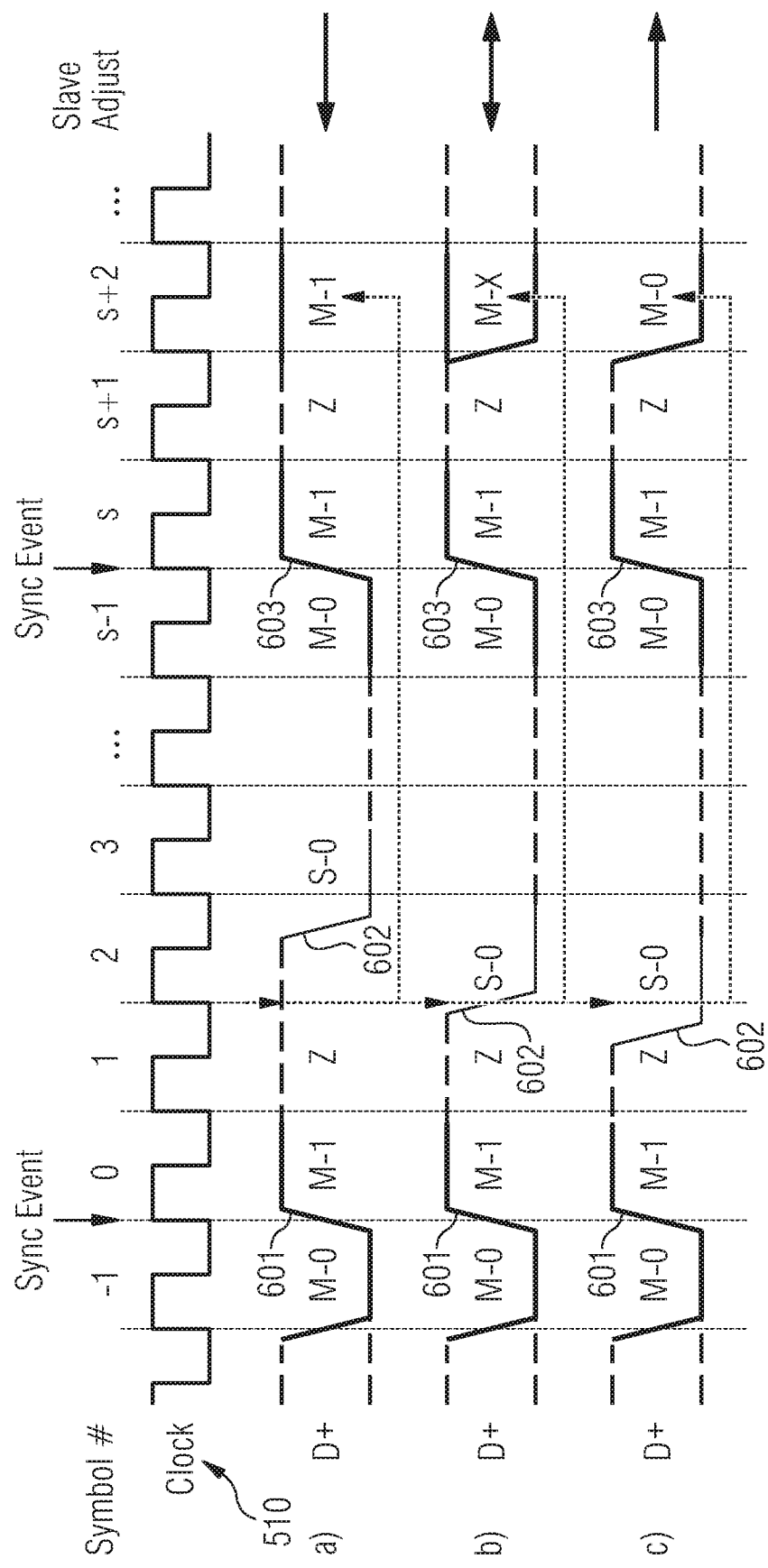
FIG. 7 illustrates another example of a proposed signal flow for calibration.

The calibration procedure will be described in the following in detail with respect to FIGS. 6 and 7. In the examples of FIGS. 6 and 7, it is assumed for ease of description that the master device 310 transmits only one first signal edge and that the slave device 320 transmits only one second signal edge. However, it is to be noted that in alternative examples plural signal edges may be transmitted by the master device 310 and the slave device 320, respectively.

The reference clock 510 is illustrated in upper part of FIG. 6. The length (duration) of a data symbol used for exchanging data between the master device 310 and the slave device 320 is again equal to the length (duration) of a clock cycle of the reference clock 510. In the lower part of FIG. 6, the signal of signal line D+ as observed at the terminal 313 of the master device 310 is again illustrated.

The master device 310 transmits a single first signal edge 601 to the slave device 320 synchronous to the leading edge of the clock cycle associated to symbol slot 0. The single first signal edge 601 indicates a synchronization event. During symbol slot 1, the signal line D+ is undriven, i.e. in a tri-state mode to avoid collisions between output data of the master device 310 and input data from the slave device 320.

The single first signal edge 601 is received by the slave device 320 and decoded to detect the synchronization event. Further, the slave device 320 recovers the reference clock of the master device based on the single first signal edge 601.

In response to detecting the synchronization event, the slave device 320 transmits a single second signal edge 602 to the master device in symbol slot 2 (a falling signal edge in the example of FIG. 6 since the master device left the interface 340 in a high signal level). As described above, the single second signal edge 602 is generated by the slave device 320 based on the recovered reference clock. The master device receives the single second signal edge 602 at the terminal 313 via the interface 340. Subsequently, the master device 310 samples the single second signal edge 602 at the leading edge of the reference clock 510 to obtain a sampled value for the single second signal edge 602.

Depending on the output timing of the slave device 320, three different cases a) to c) may occur.

In case a), the output timing of the slave device 320 is such that the single second signal edge 602 is late with respect to the reference clock 510 of the master device 310 at the terminal 313. That is, the single second signal edge 602 did not yet arrive at the terminal 313 when the master device 320 samples the signal of signal line D+ at the leading edge of the clock cycle associated to symbol slot 2. Therefore, the sampled value for the single second signal edge 602 indicates a high signal level at the signal line D+ in case a). The master device 320 transmits a high signal level in predefined symbol slot m to indicate the sampled high signal level.

In case c), the output timing of the slave device 320 is such that the single second signal edge 602 is early with respect to the reference clock 510 of the master device 310 at the terminal 313. That is, the single second signal edge 602 already arrived at the terminal 313 before the master device 320 samples the signal of signal line D+ at the leading edge of the clock cycle associated to symbol slot 2. Therefore, the sampled value for the single second signal edge 602 indicates a low signal level at the signal line D+ in case b). The master device 320 transmits a low signal level in predefined symbol slot m to indicate the sampled low signal level.

In case b), the output timing of the slave device 320 is such that the single second signal edge 602 is substantially synchronous with respect to the reference clock 510 of the master device 310 at the terminal 313. That is, the single second signal edge 602 arrives at the terminal 313 substantially at the same time the master device 320 samples the signal of signal line D+ at the leading edge of the clock cycle associated to symbol slot 2. Depending on statistic effects such as the jitter of the reference clock, the sampled value for the single second signal edge 602 indicates a low or a high signal level at the signal line D+ in case b). The chance for sampling a low or a high signal level is (substantially) the same. Accordingly, the master device 320 transmits a low signal level or a high signal level in predefined symbol slot m to indicate the low signal level or the high signal level as sampled.

In each of the cases a) to c), the slave device 320 receives the low or high signal level in symbol slot m and compares it to the single second signal edge 602 transmitted in symbol slot 2.

In case a), the comparison of the high signal level in symbol slot m to the falling signal edge transmitted in symbol slot 2 tells the slave device 320 that the second signal edge 602 trailed the reference clock 510 of the master device 310 at the terminal 313. Therefore, the slave device 320 shifts its output timing to an earlier output timing such that future signal edges output by the slave device 320 will arrive earlier at the at the terminal 313 compared to the second signal edge 602.

In case c), the comparison of the low signal level in symbol slot m to the falling signal edge transmitted in symbol slot 2 tells the slave device 320 that the second signal edge 602 led the reference clock 510 of the master device 310 at the terminal 313. Therefore, the slave device 320 shifts its output timing to a later output timing such that future signal edges output by the slave device 320 will arrive later at the at the terminal 313 compared to the second signal edge 602.

In case b), the comparison of the signal level indicated in symbol slot m to the falling signal edge transmitted in symbol slot 2 will tell the slave device 320 that the second signal edge 602 led or trailed the reference clock 510 of the master device 310 at the terminal 313 with the same probability. Accordingly, if the proposed calibration procedure is repeated multiple times, the slave device will adjust its output timing such that the arrival times of future signal edges output by the slave device 320 toggle around the leading edge of the reference clock 510.

Speaking more general (and taking into account that also multiple signal edges may be transmitted), the master device 310 may receive the one or more predetermined second signal edges within a first predetermined time slot following the one or more consecutive first signal edges (the slave device 320 may accordingly transmit the one or more predetermined second signal edges). Similarly, the slave device 320 may receive the data indicating the one or more sampled values of the master device 310 within a second predetermined time slot following the one or more consecutive first signal edges (the master device 310 may accordingly transmit the data indicating the one or more sampled values).

As described above, the master device 310 may transmit a plurality of consecutive first signal edges for indicating the synchronization event (the slave device 320 may accordingly receive the plurality of consecutive first signal edges). Similarly, the slave device 320 may transmit a plurality of predetermined second signal edges to the master device 310 (the master device 310 may accordingly receive the plurality of predetermined second signal edges). Accordingly, the master device 310 may transmit data indicating a plurality of sampled values for the plurality of predetermined second signal edges (the slave device 320 may accordingly receive the data indicating a plurality of sampled values).

Similarly to what is described above for the single second signal edge 602 transmitted in the symbol slot 2, the slave device 320 may transmit the plurality of predetermined second signal edges to the master device 310 within a third predetermined time slot following the one or more consecutive first signal edges (the master device 310 may accordingly receive the plurality of predetermined second signal edges).

Similar to what is described above for the signal level transmitted in the symbol slot in, the master device 310 may transmit data indicating a plurality of sampled values for the plurality of predetermined second signal edges to the slave device 320 within a fourth predetermined time slot following the one or more consecutive first signal edges (the slave device 320 may accordingly receive the data indicating a plurality of sampled values).

In other words, multiple known signal transitions of the slave device 320 and multiple reflected edge samples may be inserted per synchronization event for, e.g., speeding up the calibration. Further, multiple slave devices may be calibrated in serial such that multiple known signal transitions and multiple reflected edge samples are following the synchronization event.

As described above, the proposed calibration procedure may be repeated a number of times. For example, the slave device 320 may transmit one or more of the plurality of predetermined second signal edges to the master device 310 after receiving the one or more consecutive first signal edges and may further transmit one or more of the plurality of predetermined second signal edges to the master device 310 after receiving, from the master device 310, one or more consecutive third signal edges indicating a subsequent synchronization event, and so on. Accordingly, the master device 310 may sample the received one or more of the plurality of predetermined second signal edges each time and transmit respective data indicating the samples values for the one or more of the plurality of predetermined second signal edges to the slave device 320 such that the slave device can adjust its output timing iteratively.

FIG. 7 illustrates a calibration procedure similar to what is illustrated in FIG. 6. Compared to the calibration procedure illustrated in FIG. 6, a third signal edge 603 indicating a subsequent synchronization event is transmitted between the single second signal edge 602 and the signal level for indicating the signal level as sampled by the master device 620.

In the example of FIG. 7, after sampling the single second signal edge 602 in symbol slot 2, the master device 310 transmits the third single signal edge 603 synchronous to the leading edge of the clock cycle associated to symbol slot s. The third single signal edge 603 indicates a subsequent synchronization event. After transmitting the subsequent synchronization event in symbol slot s, the master device 310 transmit the respective high or low signal level in predefined symbol slot s+2 for indicating the signal level sampled in symbol slot 2.

Based on the signal level in symbol slot s+2, the slave device 320 adjusts its outputting time similar to what is described above.

Speaking more general, the master device 310 may transmit one or more consecutive third signal edges indicating a subsequent synchronization event to the slave device 320 prior to transmitting the data indicating the one or more sampled values for the one or more predetermined second signal edges. The one or more consecutive third signal edges are transmitted to the slave device 320 after receiving the one or more predetermined second signal edges from the slave device 320 (the slave device 320 may accordingly receive the one or more consecutive third signal edges). For example, the master device may transmit the data indicating the one or more sampled values for the one or more predetermined second signal edges within a predetermined time slot following the one or more consecutive third signal edges (the slave device 320 may accordingly receive the data indicating the one or more sampled values).

In other words, the inserted known signal transition of the slave device 320 and the reflected edge sample of the master device 310 may be generated after different synchronization events.

If a plurality of predetermined second signal edges are used, filtering may be used for the plurality of sampled values received from of the master device 310. For example, the proposed method for the slave device may further comprise filtering the plurality of sampled values of the master device for the plurality of predetermined second signal edges prior to adjusting the output timing of the slave device based on the comparison of the plurality of predetermined second signal edges and the plurality of sampled values of the master device. For example, multiple sampled values for a same signal edge of the plurality of predetermined second signal edges may be averaged etc. prior to comparing it to the second signal edge. In other words, filtering of multiple reflected edge sample may be done to determine the output timing adjustment.

In some examples, if the interface comprises a plurality of communication lines for communicatively coupling the master device and the slave device, the slave device may receive the one or more consecutive first signal edges via one or more first communication lines of the interface. The one or more first communication lines of the interface are different from one or more second communication lines of the interface used by the master device and the slave device for exchanging payload data. In other words, the synchronization event does not have to embedded in the data, it may be conveyed on an extra communication line. Alternatively, the slave device may receive the one or more consecutive first signal edges via one or more communication lines of the interface further used by the master device and the slave device for exchanging payload data.

Figure 8:
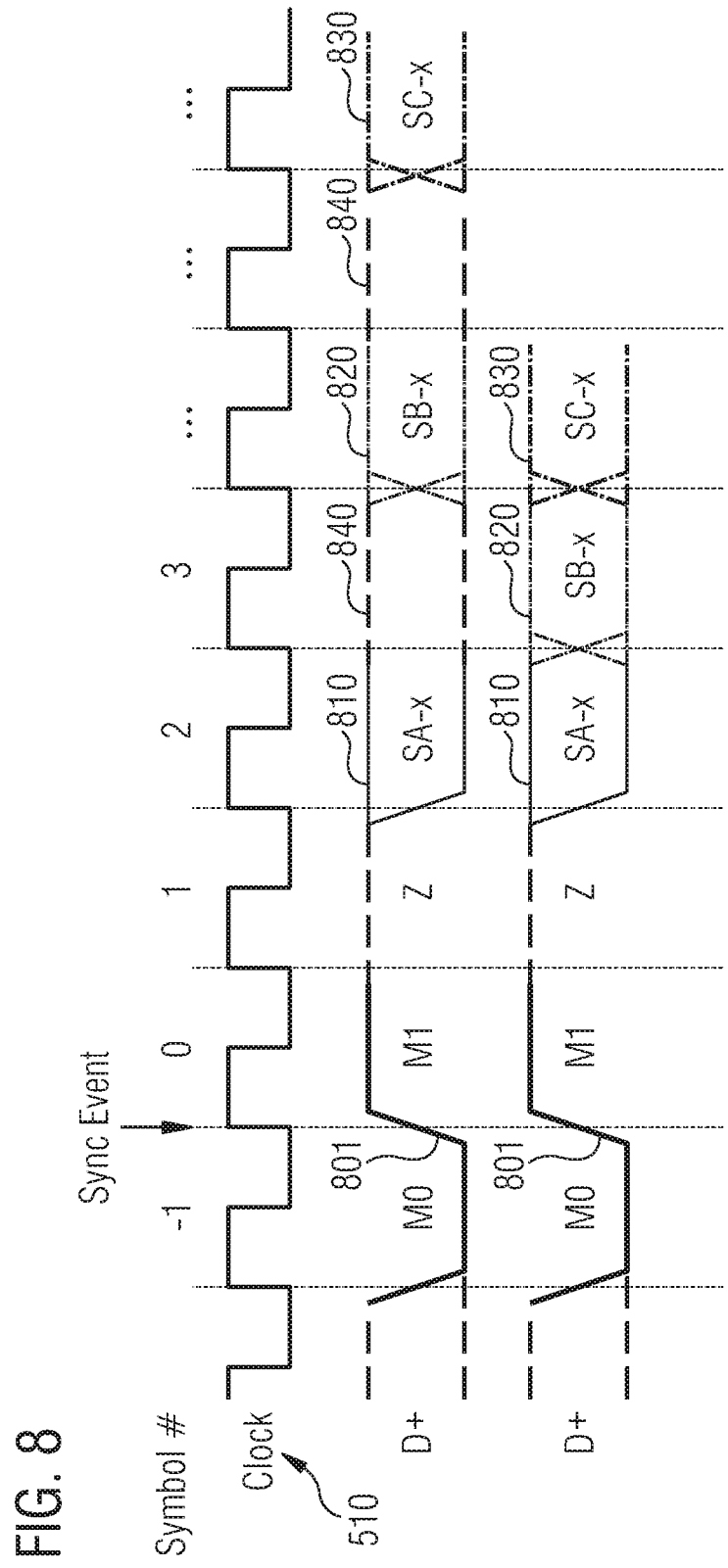
FIG. 8 illustrates an exemplary signal flow after calibration.

The effect of the proposed calibration procedure may be seen from FIG. 8. FIG. 8 illustrates a data exchange between the master device 310 and the slave devices 320 and 330 after the proposed calibration procedure. In the example of FIG. 8, it is further assumed that the system 300 comprises a third slave device. Each slave device is output timing adjusted.

The reference clock 510 of the master device 310 is illustrated in upper part of FIG. 8. In the lower part of FIG. 8, the signal of signal line D+ as observed at the terminal 313 of the master device 310 is again illustrated.

The master device 310 transmits a single signal edge 801 to the slave devices synchronous to the leading edges of the clock cycle associated to symbol slot 0. The first signal edge 801 indicates a synchronization event. During symbol slot 1, the signal line D+ is undriven, i.e. in a tri-state mode to avoid collisions between output data of the master device 310 and input data from the slave devices.

The slave devices transmit at different points in time since they are coupled to the interface at different distances to the master device 310 (e.g. a closer slave device may respond later). The data pieces 810, 820 and 830 of the three slave devices arrive with aligned data eye openings for the master device 310 due to the preceding calibration of their output timings. As described above, the proposed calibration procedure may further allow to compensate for the individual I/O delays of the master and slave devices. Due to the alignment of the slave data to the reference clock of the master device 310, single undriven symbol slots 840 and 850 between the data pieces 810, 820 and 830 as illustrated for case a) may be enough for collision avoidance. If the output timings of the individual slave devices are very well adjusted, undriven symbol slots for collision avoidance may be dropped (omitted) as illustrated for case b) in FIG. 8.

In the following, more detailed examples of master and slave devices according to proposed technique are described with reference to FIGS. 9 and 10.

Figure 9:
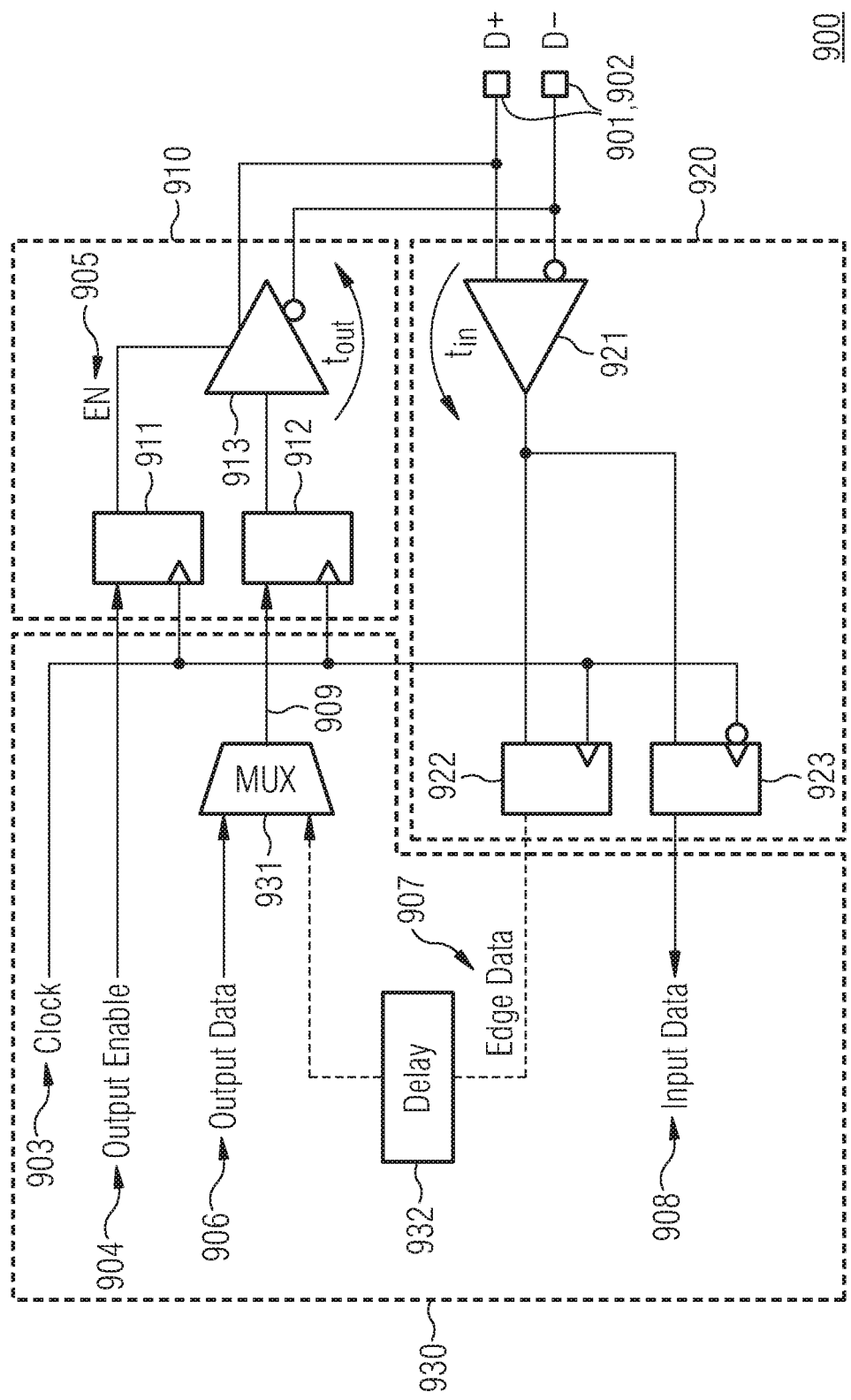
FIG. 9 illustrates an example of a master device adapted to enable a slave device communicatively coupled to the master device via, an interface to calibrate an output timing.

FIG. 9 illustrates an example of a master device 900 according to the proposed technique for enabling a slave device communicatively coupled to the master device to calibrate its output timing.

The master device 900 comprises a transmitter circuit 910, a receiver circuit 920 and a processing circuit 930. Further, the master device 900 comprises two terminals 901 and 902 for coupling the transmitter circuit 910 and the receiver circuit 920 to a differential interface (indicated by different signal lines D+ and D−) communicatively coupling the master device 900 to the slave device.

The transmitter circuit 910 comprises two flip-flop circuits 911 and 912 as well as a driver circuit 913 (e.g. an amplifier). The flip-flop circuit 911 is for enabling/disabling the driver circuit 913, whereas the flip-flop circuit 912 provides to data to be transmitted to the driver circuit 913.

The processing circuit 930 provides a reference clock signal 903 and an output enable signal 904 (indicating if the driver circuit 913 is to be enabled/disabled) to the flip-flop circuit 911. Accordingly, the flip-flop circuit 911 supplies an enable signal 905 to the driver circuit 913 which is synchronized to the reference clock.

Further, the processing circuit 930 provides the reference clock signal 903 and a data signal 909 comprising the data to be transmitted to the flip-flop-circuit 912. Accordingly, the flip-flop circuit 912 supplies a data signal to the driver circuit 913 which comprises the data to be transmitted and which is synchronized to the reference clock.

The driver circuit 913 drives the signal levels on the signal lines D+ and D− of the differential interface according to the signals provided by the flip-flop circuits 911 and 912.

The receiver circuit 920 comprises a driver circuit 921 (e.g. an amplifier) and two flip-flop circuits 922 and 923. The driver circuit 921 receives the signal levels on the signal lines D+ and D− of the differential interface and generates a single-ended receive signal based thereon. The flip-flop circuits 922 and 923 sample the single-ended receive signal based on the reference clock signal 903. The flip-flop circuit 922 samples the single-ended receive signal synchronized to the leading edge of the reference clock signal 903, whereas the flip-flop circuit 923 samples the single-ended receive signal synchronized to the trailing edge of the reference clock signal 903.

The flip-flop circuit 923 is used to sample the incoming data from the slave devices in the center of the data eye to recover the data from the slave device. Accordingly, the flip-flop circuit 922 provides an input data signal 908 comprising the sampled input data. The flip-circuit 922 is used to sample the one or more predetermined second signal edges used for calibration of the slave device. Accordingly, the flip-flop circuit 922 provides a signal 907 comprising data which indicate the sampled values for the one or more predetermined second signal edges.

The data signal 909 is provided by a multiplexer circuit 931 of the processing circuit 930. The multiplexer circuit 931 may either supply an output data signal 906 or the signal 907 comprising data which indicate the sampled values for the one or more predetermined second signal edges to the flip-flop circuit 912. For example, output data signal 906 may comprise data about the synchronization event so that the multiplexer circuit 931 supplies the data about the synchronization event as data signal 909 to the flip-flop circuit 912 (or payload data if the slave device is not calibrated). Accordingly, the driver circuit 913 transmits one or more consecutive first signal edges indicating the synchronization event to the slave device via the signal lines D+ and D− of the differential interface. For example, the synchronization event may be a transition from a low signal level to a high signal level. Based on the synchronization event, the slave device may recover the reference clock and decode the data transmitted by the master device 900.

The signal 907 comprising the data which indicate the sampled values for the one or more predetermined second signal edges is delayed by a delay circuit 932 of the processing circuit 930. The multiplexer circuit 931 supplies the delayed data indicating the sampled values for the one or more predetermined second signal edges as data signal 909 to the flip-flop circuit 912 such that the driver circuit 913 transmits the data indicating the one or more sampled values for the one or more predetermined second signal edges within a predetermined time slot following the one or more consecutive first signal edges (e.g. in a predetermined symbol slot as described above). In other words, the master device 900 may be configured to reflect "edge data" of the slave device in a later (delayed) symbol slot.

The master device 900 may allow to provide the slave device with the one or more consecutive first signal edges indicating a synchronization event and the data indicating the sampled values for the one or more predetermined second signal edges such that the slave device may adjust its outputting timing according to the proposed technique.

Figure 10:
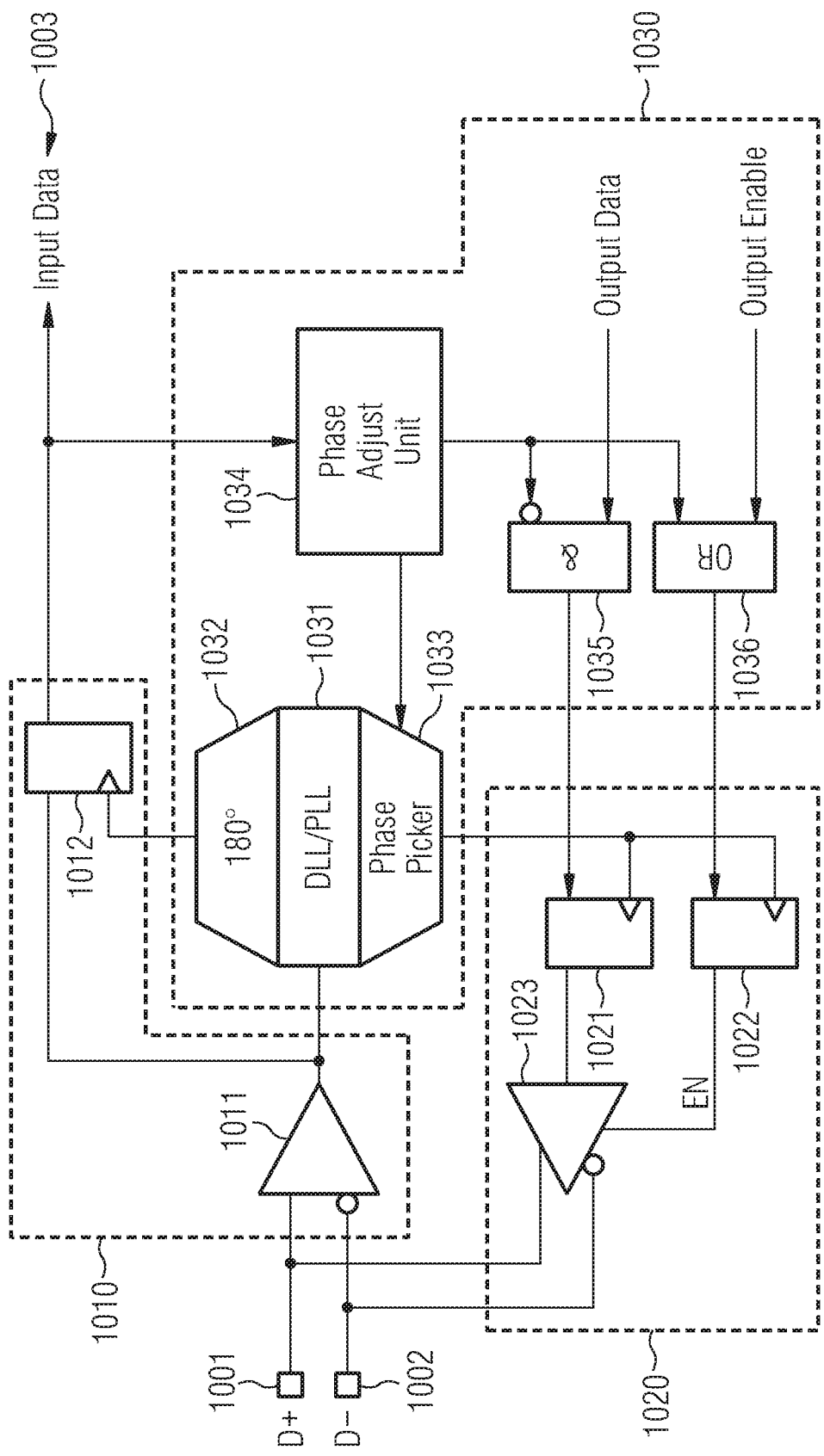
FIG. 10 illustrates an example of a slave device adapted to calibrate an output timing for transmitting data to a master device.

FIG. 10 illustrates an example of a slave device 1000 which is able to calibrate its output timing for transmitting data to a master device.

The slave device 1000 comprises a receiver circuit 1010, a transmitter circuit 1020 and a processing circuit 1030. Further, the slave device 1000 comprises two terminals 1001 and 1002 for coupling the receiver circuit 1010 and the transmitter circuit 1020 to a differential interface (indicated by different signal lines D+ and D−) communicatively coupling the slave device 1000 to the master device.

The receiver circuit 1010 comprises a driver circuit 1011 (e.g. an amplifier) and a flip-flop circuit 1012. The driver circuit 1011 receives the signal levels on the signal lines D+ and D− of the differential interface and generates a single-ended receive signal based thereon. The flip-flop circuit 1012 samples the single-ended receive signal.

The processing circuit 1030 comprises a clock recovery circuit 1031 for recovering a reference clock of the master device. The one or more consecutive first signal edges received from the master device via the differential interface indicate a synchronization event and comprise information about a phase and a frequency of the reference clock of the master device. The clock recovery circuit 1031 may, e.g., comprise a PLL or a DLL to recover the master device's reference clock using known clock recovery techniques. In other words, the slave device 1000 may recover the reference clock with a PLL or a DLL based on a synchronization event embedded in the data sent by the master device.

The recovered reference clock is delayed by 180° via a delay circuit 1032 of the processing circuit 1030 to provide a delayed replica of the reference clock for the flip-flop circuit 1012. The flip-flop circuit 1012 samples the single-ended receive signal synchronized to the leading edge of the delayed reference clock (i.e. effectively synchronous to the trailing edge of the actual reference clock) such the received input data is sampled in the middle of the data eye. The flip-flop circuit 1012 provides an input data signal 1003 comprising the sampled input data.

The transmitter circuit 1020 comprises two flip-flop circuits 1021 and 1022 as well as a driver circuit 1023 (e.g. an amplifier). The flip-flop circuit 1022 is for enabling/disabling the driver circuit 1023, whereas the flip-flop circuit 1021 provides to data to be transmitted to the driver circuit 1023. The driver circuit 1023 drives the signal levels on the signal lines D+ and D− of the differential interface according to the signals provided by the flip-flop circuits 1021 and 1022. The flip-flop circuits 1021 and 1022 are controlled by the processing circuit 1030.

The processing circuit 1030 comprises a phase adjustment circuit 1034. The phase adjustment circuit 1034 receives the input data signal 1003 from the flip-flop circuit 1012. If the input data signal 1003 comprises the one or more signal edges of the master device for indicating the synchronization event, the phase adjustment circuit 1034 controls the transmitter circuit 1020 via the AND gate 1035 and the OR gate 1036 to output the one or more predetermined second signal edges. In other words, the slave device may transmit a known data transition to the master device (e.g. driving the signal level low after the master device has left the interface at a high signal level).

Subsequently, the data indicating the one or more sampled values of the master device for the one or more predetermined second signal edges are received by the slave device 1000 from the master device. The data indicating the one or more sampled values are provided to the phase adjustment circuit 1034 by means of the input data signal 1003. The phase adjustment circuit 1034 compares the one or more predetermined second signal edges to the one or more sampled values of the master device for the one or more predetermined second signal edges to determine the adjustment of the slave device 1000's output timing.

The clock recovery circuit 1031 provides a plurality of phase shifted replicas of the recovered reference clock. Based on the comparison of the one or more predetermined second signal edges to the one or more sampled values of the master device for the one or more predetermined second signal edges, the phase adjustment circuit 1034 controls a phase selection circuit 1033 of the processing device 1030 to select one of the plurality of phase shifted replicas of the recovered reference clock. In other words, the phase selection circuit 1033 uses the edge data reflected by the master device to adjust the output timing of the slave device 1000.

The phase selection circuit 1033 supplies the selected replica of the recovered reference clock to the flip-flop circuits 1021 and 1022 of the transmitter device 1020 such that the flip-flop circuit 1022 enables/disables the driver circuit 1023 synchronous to the leading signal edge of the selected replica of the recovered reference clock and such that the flip-flop circuit 1021 provides the data to be transmitted synchronous to the leading signal edge of the selected replica of the recovered reference clock to the driver circuit 1023. In other words, the slave device 1000 may adjust its output timing in fractions of the clock period (e.g. the clock phases may be provided by a DLL).

If the slave device 1000 is not calibrating its output timing, the AND gate 1035 and the OR gate 1036 allow to provide payload data or other data to be transmitted to the flip-flop circuits 1021 and 1022 of the transmitter device 1020 such that the flip-flop circuits 1021 and 1022 control the driver circuit 1023 to drive the lines D+ and D− of the differential interface according to the data to be transmitted.

Although not illustrated in FIGS. 9 and 10, the master device 900 and the slave device 1000 may optionally comprise further circuitry and/or elements.

The examples as described herein may be summarized as follows:

Some examples relate to a method for a slave device for calibrating an output timing for transmitting data to a master device. The master device and the slave device are communicatively coupled via an interface. The method comprises receiving, from the master device, one or more consecutive first signal edges indicating a synchronization event. Further, the method comprises recovering a reference clock of the master device based on the one or more consecutive first signal edges. The method comprises transmitting one or more predetermined second signal edges to the master device. The one or more predetermined second signal edges are generated by the slave device using the recovered reference clock. Additionally, the method comprises receiving, from the master device, data indicating one or more sampled values of the master device for the one or more predetermined second signal edges. The method comprises adjusting the output timing based on a comparison of the one or more predetermined second signal edges and the one or more sampled values of the master device for the one or more predetermined second signal edges.

In some examples, adjusting the output timing comprises: comparing one or more signal levels indicated by the one or more sampled values of the master device with the one or more predetermined second signal edges for determining whether the one or more predetermined second signal edges are leading or trailing the reference clock of the master device; and shifting the output timing of the slave device to an earlier output timing if the one or more predetermined second signal edges are trailing the reference clock of the master device; or shifting the output timing of the slave device to a later output timing if the one or more predetermined second signal edges are leading the reference clock of the master device.

According to some examples, the slave device receives the data indicating the one or more sampled values of the master device within a predetermined time slot following the one or more consecutive first signal edges.

In alternative examples, the slave device receives the data indicating the one or more sampled values of the master device a after receiving, from the master device, one or more consecutive third signal edges indicating a subsequent synchronization event, wherein the one or more consecutive third signal edges are received by the slave device after transmitting the one or more predetermined second signal edges to the master device.

In some examples, the one or more consecutive first signal edges encode information about a phase and a frequency of the reference clock of the master device.

According to some examples, the slave device transmits a plurality of predetermined second signal edges to the master device, and wherein the slave device receives data indicating a plurality of sampled values of the master device for the plurality of predetermined second signal edges.

In some examples, the slave device transmits the plurality of predetermined second signal edges to the master device within a predetermined time slot following the one or more consecutive first signal edges.

In alternative examples, the slave device transmits one or more of the plurality of predetermined second signal edges to the master device after receiving the one or more consecutive first signal edges and further transmits one or more of the plurality of predetermined second signal edges to the master device after receiving, from the master device, one or more consecutive third signal edges indicating a subsequent synchronization event.

According to some examples, the method further comprises filtering the plurality of sampled values of the master device for the plurality of predetermined second signal edges prior to adjusting the output timing of the slave device based on the comparison of the plurality of predetermined second signal edges and the plurality of sampled values of the master device.

In some examples, the interface comprises a plurality of communication lines for communicatively coupling the master device and the slave device. The slave device receives the one or more consecutive first signal edges via one or more first communication lines of the interface. The one or more first communication lines of the interface are different from one or more second communication lines of the interface used by the master device and the slave device for exchanging payload data.

According to some examples, the method is performed during boot up of the slave device.

In other examples, the method is performed between two payload data exchanges between the master device and the slave device.

Other examples relate to a method for a master device for enabling a slave device communicatively coupled to the master device via an interface to calibrate an output timing. The method comprises transmitting one or more consecutive first signal edges indicating a synchronization event to the slave device. The one or more consecutive first signal edges are generated using a reference clock of the master device. Further, the method comprises sampling one or more predetermined second signal edges received from the slave device using the reference clock to obtain sampled values for the one or more predetermined second signal edges. The method additionally comprises transmitting data indicating the one or more sampled values for the one or more predetermined second signal edges to the slave device.

According to some examples, the master device transmits the data indicating the one or more sampled values for the one or more predetermined second signal edges within a predetermined time slot following the one or more consecutive first signal edges.

According to alternative examples, the master device transmits one or more consecutive third signal edges indicating a subsequent synchronization event to the slave device prior to transmitting the data indicating the one or more sampled values for the one or more predetermined second signal edges, wherein the one or more consecutive third signal edges are transmitted to the slave device after receiving the one or more predetermined second signal edges from the slave device.

In some examples, the one or more consecutive first signal edges encode information about a phase and a frequency of the reference clock.

According to some examples, the master device receives a plurality of predetermined second signal edges from the slave device, and wherein the master device transmits data indicating a plurality of sampled values for the plurality of predetermined second signal edges.

In some examples, the master device receives the plurality of predetermined second signal edges from the slave device within a predetermined time slot following the one or more consecutive first signal edges.

In alternative examples, the master device receives one or more of the plurality of predetermined second signal edges from the slave device after transmitting the one or more consecutive first signal edges and further receives one or more of the plurality of predetermined second signal edges from the slave device after transmitting one or more consecutive third signal edges indicating a subsequent synchronization event.

According to some examples, the interface comprises a plurality of communication lines for communicatively coupling the master device and the slave device. The master device transmits the one or more consecutive first signal edges via one or more first communication lines of the interface. The one or more first communication lines of the interface are different from one or more second communication lines of the interface used by the master device and the slave device for exchanging payload data.

In some examples, the method is performed during boot up of the slave device.

In other examples, the method is performed between two payload data exchanges between the master device and the slave device.

Further examples relate to a slave device adapted to calibrate an output timing for transmitting data to a master device. The master device and the slave device are communicatively coupled via an interface. The slave device comprises a receiver circuit configured to receive, from the master device, one or more consecutive first signal edges indicating a synchronization event. Further, the slave device comprises a processing circuit configured to recover a reference clock of the master device based on the one or more consecutive first signal edges. The slave device additionally comprises a transmitter circuit configured to transmit one or more predetermined second signal edges to the master device. The one or more predetermined second signal edges are generated by the slave device using the recovered reference clock. The receiver circuit is further configured to receive, from the master device, data indicating one or more sampled values of the master device for the one or more predetermined second signal edges. The processing circuit is further configured to adjust the output timing based on a comparison of the one or more predetermined second signal edges and the one or more sampled values of the master device for the one or more predetermined second signal edges.

Still further examples relate to a master device adapted to enable a slave device communicatively coupled to the master device via an interface to calibrate an output timing. The master device comprises a transmitter circuit configured to transmitting one or more consecutive first signal edges indicating a synchronization event to the slave device, wherein the one or more consecutive first signal edges are generated using a reference clock of the master device. Additionally, the master device comprises a receiver circuit configured to sample one or more predetermined second signal edges received from the slave device using the reference clock to obtain sampled values for the one or more predetermined second signal edges. The transmitter circuit is further configured to transmit data indicating the one or more sampled values for the one or more predetermined second signal edges to the slave device.

Some examples relate to a system comprising a master device as described herein, at least one slave device as described herein and an interface configured to communicatively couple the master device and the at least one slave device.

Examples relate to a non-transitory machine readable medium having stored thereon a program having a program code for causing a slave device to perform the method for calibrating an output timing as described herein, when the program is executed on a programmable hardware of the slave device.

Other examples relate to a program having a program code for causing a slave device to perform the method for calibrating an output timing as described herein, when the program is executed on a programmable hardware of the slave device.

Further examples relate to a non-transitory machine readable medium having stored thereon a program having a program code for causing a master device to perform the method for enabling a slave device to calibrate an output timing as described herein, when the program is executed on a programmable hardware of the master device.

Other examples relate to a program having a program code for causing a master device to perform the method for enabling a slave device to calibrate an output timing as described herein, when the program is executed on a programmable hardware of the master device.

Some example relate to an apparatus comprising means for causing a slave device to perform the method for calibrating an output timing as described herein.

Further examples relate to an apparatus comprising means for causing a master device to perform the method for enabling a slave device to calibrate an output timing as described herein.

Examples of the present disclosure may enable fast output timing calibration for high-speed interfaces.

The aspects and features mentioned and described together with one or more of the previously detailed examples and figures, may as well be combined with one or more of the other examples in order to replace a like feature of the other example or in order to additionally introduce the feature to the other example.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation, or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for a slave device for calibrating an output timing for transmitting data to a master device, wherein the master device and the slave device are communicatively coupled via an interface, the method comprising:
   receiving, from the master device, one or more consecutive first signal edges indicating a synchronization event;
   recovering a reference clock of the master device based on the one or more consecutive first signal edges;
   transmitting one or more predetermined second signal edges to the master device, wherein the one or more predetermined second signal edges are generated by the slave device using the recovered reference clock;
   receiving, from the master device, data indicating a signal level of one or more sampled values for the one or more predetermined second signal edges as sampled by the master device at an edge of the reference clock; and
   adjusting the output timing based on a comparison of the one or more predetermined second signal edges and the one or more sampled values of the master device for the one or more predetermined second signal edges.

2. The method of claim 1, wherein adjusting the output timing comprises:
   comparing one or more signal levels indicated by the one or more sampled values of the master device with the one or more predetermined second signal edges for determining whether the one or more predetermined second signal edges are leading or trailing the reference clock of the master device; and
   shifting the output timing of the slave device to an earlier output timing if the one or more predetermined second signal edges are trailing the reference clock of the master device, or shifting the output timing of the slave device to a later output timing if the one or more predetermined second signal edges are leading the reference clock of the master device.

3. The method of claim 1, wherein the slave device receives the data indicating the one or more sampled values of the master device after receiving, from the master device, one or more consecutive third signal edges indicating a subsequent synchronization event, and wherein the one or more consecutive third signal edges are received by the slave device after transmitting the one or more predetermined second signal edges to the master device.

4. The method of claim 1, wherein the one or more consecutive first signal edges encode information about a phase and a frequency of the reference clock of the master device.

5. The method of claim 1, wherein the slave device transmits a plurality of predetermined second signal edges to the master device, and wherein the slave device receives data indicating a plurality of sampled values of the master device for the plurality of predetermined second signal edges.

6. The method of claim 1, wherein the interface comprises a plurality of communication lines for communicatively coupling the master device and the slave device, wherein the slave device receives the one or more consecutive first signal edges via one or more first communication lines of the interface, and wherein the one or more first communication lines of the interface are different from one or more second communication lines of the interface used by the master device and the slave device for exchanging payload data.

7. The method of claim 1, wherein the method is performed between two payload data exchanges between the master device and the slave device.

8. A method for a master device for enabling a slave device communicatively coupled to the master device via an interface to calibrate an output timing, the method comprising:
    transmitting one or more consecutive first signal edges indicating a synchronization event to the slave device, wherein the one or more consecutive first signal edges are generated using a reference clock of the master device;
    sampling one or more predetermined second signal edges received from the slave device using the reference clock to obtain one or more sampled values for the one or more predetermined second signal edges; and
    transmitting, to the slave device, data indicating a signal level of the one or more sampled values for the one or more predetermined second signal edges as sampled by the master device at an edge of the reference clock.

9. The method of claim 8, wherein the one or more consecutive first signal edges encode information about a phase and a frequency of the reference clock.

10. The method of claim 8, wherein the master device receives a plurality of predetermined second signal edges from the slave device, and wherein the master device transmits data indicating a plurality of sampled values for the plurality of predetermined second signal edges.

11. The method of claim 10, wherein the master device receives one or more of the plurality of predetermined second signal edges from the slave device after transmitting the one or more consecutive first signal edges and further receives one or more of the plurality of predetermined second signal edges from the slave device after transmitting one or more consecutive third signal edges indicating a subsequent synchronization event.

12. The method of claim 8, wherein the interface comprises a plurality of communication lines for communicatively coupling the master device and the slave device, wherein the master device transmits the one or more consecutive first signal edges via one or more first communication lines of the interface, and wherein the one or more first communication lines of the interface are different from one or more second communication lines of the interface used by the master device and the slave device for exchanging payload data.

13. A slave device adapted to calibrate an output timing for transmitting data to a master device, wherein the master device and the slave device are communicatively coupled via an interface, the slave device comprising:
    a receiver circuit configured to receive, from the master device, one or more consecutive first signal edges indicating a synchronization event;
    a processing circuit configured to recover a reference clock of the master device based on the one or more consecutive first signal edges; and
    a transmitter circuit configured to transmit one or more predetermined second signal edges to the master device, the one or more predetermined second signal edges generated by the slave device using the recovered reference clock,
    wherein the receiver circuit is further configured to receive, from the master device, data indicating a signal level of one or more sampled values for the one or more predetermined second signal edges as sampled by the master device at an edge of the reference clock,
    wherein the processing circuit is further configured to adjust the output timing based on a comparison of the one or more predetermined second signal edges and the one or more sampled values of the master device for the one or more predetermined second signal edges.

14. A master device adapted to enable a slave device communicatively coupled to the master device via an interface to calibrate an output timing, the master device comprising:
    a transmitter circuit configured to transmitting one or more consecutive first signal edges indicating a synchronization event to the slave device, the one or more consecutive first signal edges generated using a reference clock of the master device; and
    a receiver circuit configured to sample one or more predetermined second signal edges received from the slave device using the reference clock to obtain one or more sampled values for the one or more predetermined second signal edges,
    wherein the transmitter circuit is further configured to transmit, to the slave device, data indicating a signal level of the one or more sampled values for the one or more predetermined second signal edges as sampled by the master device at an edge of the reference clock.

15. A system, comprising:
    the master device of claim 14;
    the slave of claim 13; and
    an interface configured to communicatively couple the master device and the slave device.

* * * * *